United States Patent
Zell et al.

(10) Patent No.: US 10,571,481 B2
(45) Date of Patent: Feb. 25, 2020

(54) LOW WHEEL SPEED DETECTION UTILIZING VARIABLE RELUCTANCE SPEED TRANSDUCER

(71) Applicant: Goodrich Corporation, Charlotte, NC (US)

(72) Inventors: Brian Keith Zell, Dayton, OH (US); Michael Kordik, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 293 days.

(21) Appl. No.: 14/938,233

(22) Filed: Nov. 11, 2015

(65) Prior Publication Data

US 2017/0131321 A1    May 11, 2017

(51) Int. Cl.
*G01P 3/48* (2006.01)
*G01P 3/488* (2006.01)

(52) U.S. Cl.
CPC ............ *G01P 3/4802* (2013.01); *G01P 3/488* (2013.01)

(58) Field of Classification Search
CPC .. G01P 3/44; G01P 3/443; G01P 3/446; G01P 3/46; G01P 3/465; G01P 3/48; G01P 3/4802; G01P 3/4805; G01P 3/4807
USPC ................................................. 324/160–180
See application file for complete search history.

(56) References Cited

U.S. PATENT DOCUMENTS

| | | | |
|---|---|---|---|
| 3,880,475 A * | 4/1975 | Booher | B60T 8/1703 244/111 |
| 4,028,686 A | 6/1977 | Wilson et al. | |
| 4,086,532 A * | 4/1978 | Aronson | G01P 1/08 324/161 |
| 4,336,592 A * | 6/1982 | Beck | B60T 8/1703 303/112 |
| 4,580,127 A * | 4/1986 | Blowers | H03M 1/50 340/457.4 |
| 5,430,370 A * | 7/1995 | Rooke | G01P 3/481 324/207.12 |
| 5,821,745 A | 10/1998 | Makino et al. | |

(Continued)

FOREIGN PATENT DOCUMENTS

JP        2005241365 A        9/2005

OTHER PUBLICATIONS

Extended European Search Report dated Mar. 21, 2017 in European Application No. 16198021.4.

(Continued)

*Primary Examiner* — Lee E Rodak
(74) *Attorney, Agent, or Firm* — Snell & Wilmer, L.L.P.

(57) ABSTRACT

Systems and methods for detecting wheel speed are provided. An electric circuit for detecting a speed of a wheel may comprise: a transducer in electronic communication with an operational amplifier (OP-AMP), the transducer configured to output a variable signal in response to an angular velocity of a rotatable member of a wheel assembly; a constant voltage source in electronic communication with the OP-AMP; and a sensor in electronic communication with an output terminal of the OP-AMP configured to monitor an output signal of the OP-AMP, the output signal including a period; and a controller configured to receive the output signal and configured to calculate the speed of the wheel according to a pre-determined ratio of the wheel speed and the period. In various embodiments, the circuit may allow for slow wheel speed detection.

7 Claims, 4 Drawing Sheets

(56) References Cited

U.S. PATENT DOCUMENTS

| | | | |
|---|---|---|---|
| 6,407,605 B1 * | 6/2002 | McCann | H03K 3/037 |
| 6,433,534 B1 * | 8/2002 | Spellman | G01D 5/2013 |
| | | | 324/207.15 |
| 6,442,502 B1 | 8/2002 | Lohberg | |
| 2003/0196932 A1 | 9/2003 | Wild | |
| 2004/0249544 A1 | 12/2004 | Lohberg | |
| 2013/0271112 A1 * | 10/2013 | Vazach | G01D 5/2448 |
| | | | 324/76.19 |

OTHER PUBLICATIONS

Bryant, "AN-849 Application Note—Using Op Amps as Comparators," Nov. 18, 2011, pp. 1-8.
Wikipedia, "Comparator," Mar. 26, 2015, pp. 1-6.
Unknown, "Op-amp Comparator," Electronics Tutorials, Jun. 25, 2015, pp. 1-14.
European Patent Office, European Search Report dated Jul. 25, 2018 in Application No. 16198021.4-1022.

\* cited by examiner

LOW WHEEL SPEED DETECTION UTILIZING VARIABLE RELUCTANCE SPEED TRANSDUCER

FIELD

The present disclosure relates generally to electrical systems on a vehicle and more specifically to a system for detecting the speed of a wheel.

BACKGROUND

A typical variable reluctance wheel speed transducer generically acts as an alternating voltage generator in response to rotational movement. However, the output reduces as the speed decreases, which may limit the detection of low speed rotation.

SUMMARY

Systems and methods for detecting wheel speed are provided. An electric circuit for detecting a speed of a wheel may comprise a transducer in electronic communication with an operational amplifier (OP-AMP), the transducer configured to output a variable signal in response to an angular velocity of a rotatable member of a wheel assembly; a constant voltage source in electronic communication with the OP-AMP; and a sensor in electronic communication with an output terminal of the OP-AMP configured to monitor an output signal of the OP-AMP, the output signal including a period; and a controller configured to receive the output signal and configured to calculate the speed of the wheel according to a pre-determined ratio of the wheel speed and the period.

In various embodiments, transducer may be coupled to the wheel assembly. The transducer may be in electronic communication with a positive terminal of the OP-AMP. The transducer may be in electronic communication with a negative terminal of the OP-AMP. The constant voltage source may be in electronic communication with a positive terminal of the OP-AMP. The constant voltage source may be in electronic communication with a negative terminal of the OP-AMP. A supply voltage may be in electronic communication with the OP-AMP. The OP-AMP may be configured to output a signal comprising a first magnitude in response to the variable signal being greater than the constant voltage source and may be configured to output the signal comprising a second magnitude in response to the variable signal being less than the constant voltage source.

A method for detecting a speed of a wheel may comprise: detecting a frequency of an output signal of an operational amplifier (OP-AMP), the OP-AMP in electronic communication with a transducer configured to output a variable signal in response to an angular velocity of a rotatable member of a wheel assembly, and in electronic communication with a constant voltage source of less than 1 volt, the output signal of the OP-AMP generated by comparing the variable signal with the constant voltage source; and detecting the speed of the wheel according to a pre-determined ratio of the wheel speed and the frequency of the output signal of the OP-AMP.

In various embodiments, the method may further comprise coupling the transducer to the wheel assembly. The method may further comprise connecting the transducer to the operational amplifier (OP-AMP). The speed of the wheel may be detected by multiplying the frequency by the pre-determined ratio. The output signal of the OP-AMP may comprise a first magnitude in response to the variable signal being greater than the constant voltage source and may comprise a second magnitude in response to the variable signal being less than the constant voltage source.

A system for detecting a speed of a wheel may comprise: a transducer, the transducer configured to output a variable signal in response to an angular velocity of a rotatable member of a wheel assembly; an electronics control unit (ECU) in electronic communication with the transducer comprising: an operational amplifier (OP-AMP); a constant voltage source in electronic communication with the OP-AMP; and a sensor in electronic communication with an output terminal of the OP-AMP.

In various embodiments, the transducer may be coupled to the wheel assembly. The transducer may be in electronic communication with a positive terminal of the OP-AMP in response to the constant voltage source being in electronic communication with a negative terminal of the OP-AMP. The transducer may be in electronic communication with a negative terminal of the OP-AMP in response to the constant voltage source being in electronic communication with a positive terminal of the OP-AMP. A supply voltage may be in electronic communication with the OP-AMP. The OP-AMP may be configured to output a signal comprising a first magnitude in response to the variable signal being greater than the constant voltage source and may be configured to output the signal comprising a second magnitude in response to the variable signal being less than the constant voltage source. The ECU may be located on an aircraft.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, an electric circuit for detecting a speed of a wheel may comprise a transducer, an operational amplifier (OP-AMP), and a constant voltage source. A sensor may detect an output signal of the OP-AMP. The electric circuit may be in electronic communication with a controller (also referred to herein as an electronics control unit). Although previously described as an electric circuit in communication with the controller, in various embodiments, various components of the electric circuit may be included in the controller. For example, the controller may include any of the OP-AMP, the constant voltage source, and/or the sensor wherein the transducer is electrically coupled to the controller.

Figure 1A:
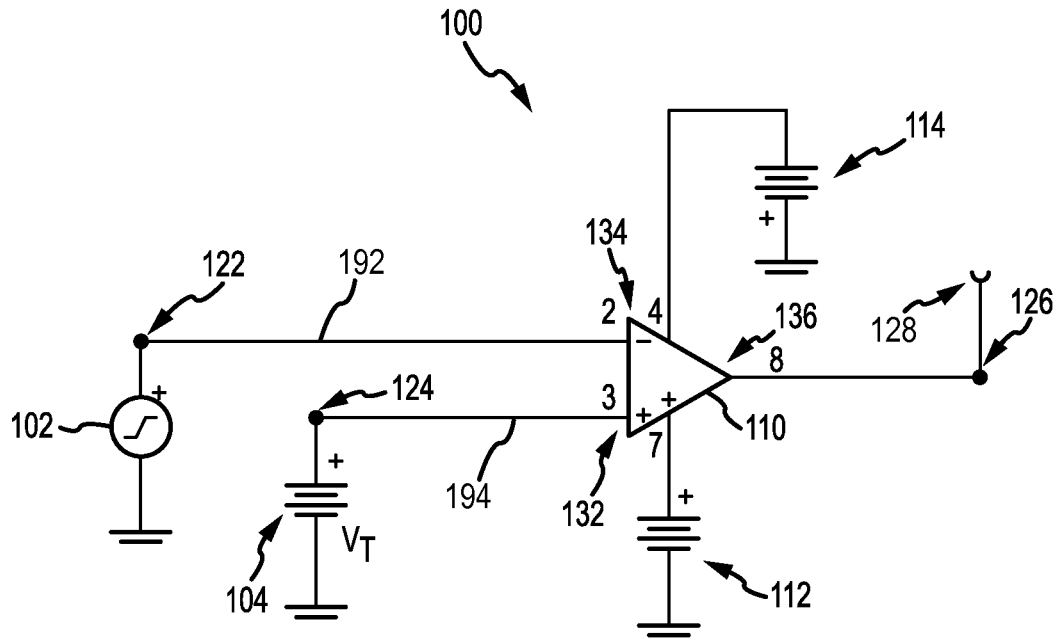
FIG. 1A illustrates an electric circuit for detecting a speed of a wheel, in accordance with various embodiments.

With reference to FIG. 1A, a schematic view of an electric circuit 100 for detecting a speed of a wheel is illustrated, in accordance with various embodiments. Electric circuit 100 may include various components. In accordance with various embodiments, Electric circuit 100 may include a transducer 102, an operational amplifier (OP-AMP) 110, and constant voltage source 104. In various embodiments, the OP-AMP 110 may be electrically coupled to a first supply voltage 112 and a second supply voltage 114. In various embodiments, OP-AMP 110 may comprise a negative terminal 134, a positive terminal 132, and an output terminal 136.

In various embodiments, transducer 102 may be in electronic communication with OP-AMP 110. Variable signal 122 may take a sine wave form with amplitude proportional to and cycle-to-cycle time duration inversely proportional to angular velocity. Transducer 102 may be configured to output a variable signal 122 in response to an angular velocity of a rotatable member of a wheel assembly. Constant voltage source 104 may be in electronic communication with OP-AMP 110. Sensor 128 may be in electronic communication with an output terminal of the OP-AMP. Sensor 128 may be in electronic communication with output terminal 136. Sensor 128 may detect and may provide an output indicating the portion of signal 122 which is greater (or less) in amplitude than constant voltage source 104.

In various embodiments, transducer 102 may comprise a variable reluctance sensor. In various embodiments, transducer 102 may comprise a wheel speed sensor. In various embodiments, constant voltage source 104 may comprise a direct current (DC) voltage source.

Figure 1B:
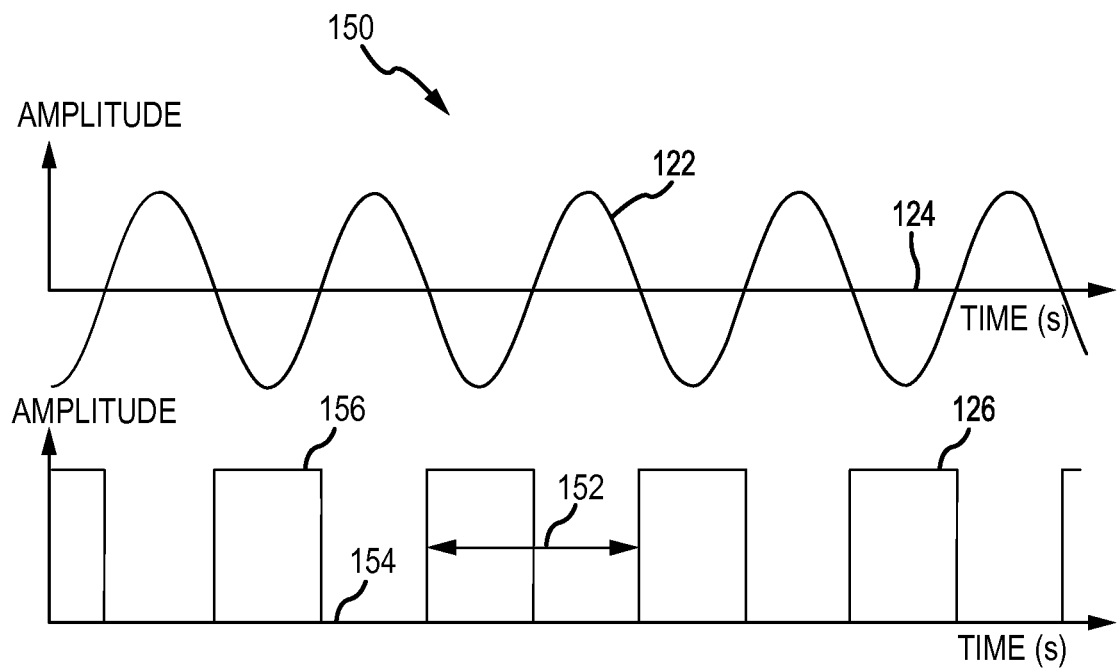
FIG. 1B illustrates various signals corresponding to the electric circuit of FIG. 1A, in accordance with various embodiments.
Figure 3:
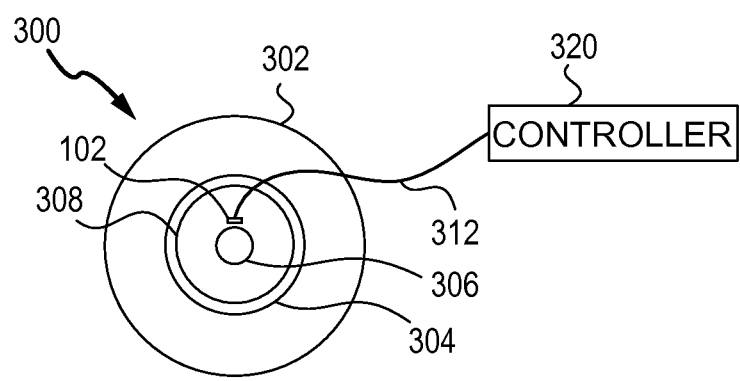
FIG. 3 illustrates a wheel assembly coupled to a system for detecting a speed of the wheel.

With respect to FIG. 1B and FIG. 3, elements with like element numbering, as depicted in FIG. 1A, are intended to be the same and will not necessarily be repeated for the sake of clarity.

With reference to FIG. 3, a wheel assembly 300 coupled to a controller 320 is illustrated. In various embodiments, wheel assembly 300 may include a wheel 304 including a hub 306. Wheel assembly 300 may include a tire 302 coupled to wheel 304. Wheel assembly 300 may include a braking element (also referred to herein as brake stack) 308. Brake stack 308 may comprise one or more rotating members coupled to stationary members. Brake stack 308 may be configured to create a load path between a ground surface, such as a runway, road, earth, or the like for example, and wheel assembly 300 to stop or slow down the rotational speed or angular velocity of wheel 304. Accordingly, wheel 304 may comprise a rotatable member of wheel assembly 300. In various embodiments, wheel assembly 300 may comprise various rotatable members such as an axle, wheel 304, gears, and various other members, for example. A rotatable member may comprise any portion of wheel assembly 300 or adjacent components configured to rotate with or in response to the rotation of wheel 304.

In various embodiments, transducer 102 may be coupled to wheel assembly 300. Transducer 102 may be configured to convert speed information of wheel 304 into a periodic voltage signal. In various embodiments, transducer 102 may be in electronic communication with controller (also referred to herein as an electronics control unit (ECU)) 320. With momentary reference to FIG. 1A & FIG. 3, controller 320 may comprise one or more of the components included in circuit 100. In various embodiments, controller 320 may be located on a vehicle, such as an aircraft for example, supported by wheel assembly 300. However, the controller 320 may be located in any location.

With reference to FIG. 1A and FIG. 1B, transducer 102 may be in electronic communication with a negative terminal 134 of OP-AMP 110, in accordance with various embodiments. FIG. 1A illustrates transducer 102 in electronic communication with negative terminal 134 via wire 192. In various embodiments, constant voltage source 104 may be in electronic communication with a positive terminal 132 of OP-AMP 110. FIG. 1A illustrates constant voltage source 104 in electronic communication with positive terminal 132 via wire 194. In this light, transducer 102 may be in electronic communication with a negative terminal 134 of OP-AMP 110 in response to constant voltage source 104 being in electronic communication with a positive terminal 132 of OP-AMP 110. In this arrangement, as illustrated in FIG. 1A, OP-AMP 110 may be configured to output a signal (also referred to herein as an output signal) 126 comprising a first magnitude 154 in response to the variable signal 122 being greater than the constant voltage source signal 124 and may be configured to output an output signal 126 comprising a second magnitude 156 in response to the variable signal 122 being less than the constant voltage source signal 124.

Accordingly, output signal 126 may be a periodic signal. Output signal 126 may comprise a frequency which corresponds to a period 152. Period 152 may be defined as the inverse of the frequency of output signal 126. Period 152 may comprise units of seconds. For example, the period 152 of output signal 126 may be 0.01 seconds corresponding to a frequency of 100 Hertz.

With further reference to FIG. 3, controller 320 may calculate the speed of a wheel corresponding to the period 152 of output signal 126. A pre-determined ratio may be used to calculate the wheel speed. For example, if a pre-determined ratio of wheel speed, in miles per hour (MPH), to period 152, in seconds (s), is determined to be 100, then a wheel speed may be calculated by multiplying the period 152 measured in second by 100. Continuing the example, if the period 152 is measured to be 0.01 seconds, then the resulting wheel speed may be 0.01 seconds multiplied by the pre-determined ratio of 100 to get 1 MPH (0.447 m/s). Similarly, a wheel speed may be calculated corresponding to a frequency of output signal 126.

Figure 2A:
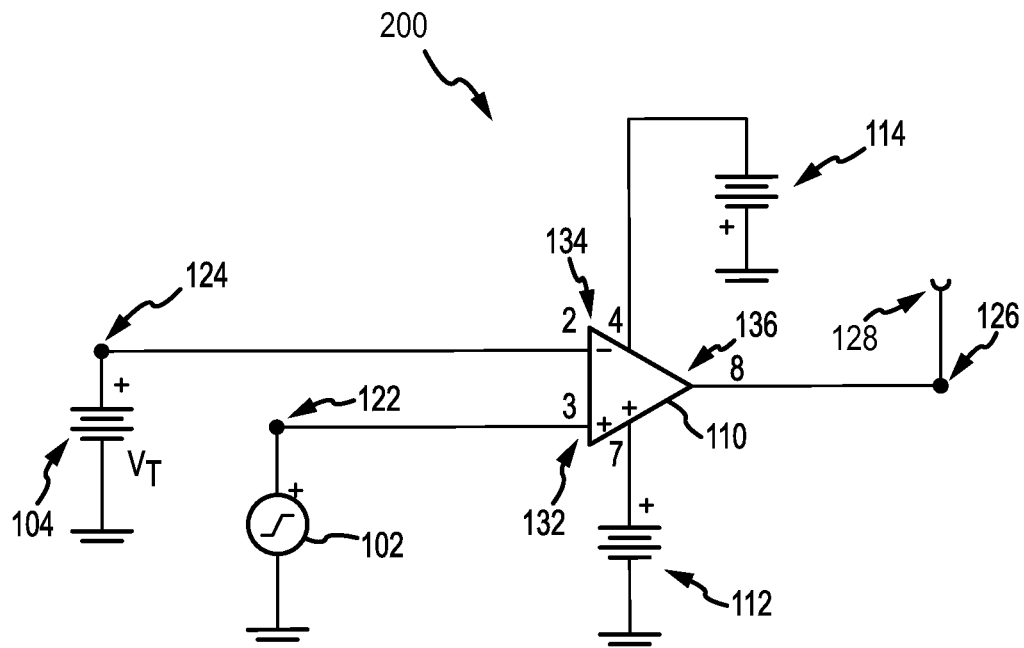
FIG. 2A illustrates an electric circuit for detecting a speed of a wheel, in accordance with various embodiments.
Figure 2B:
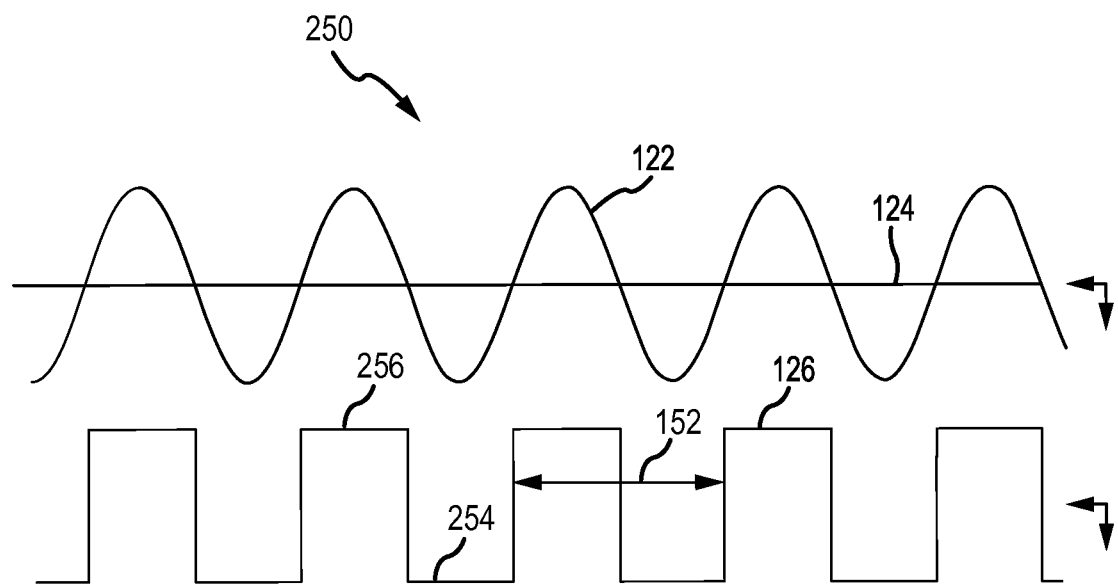
FIG. 2B illustrates various signals corresponding to the electric circuit of FIG. 2A, in accordance with various embodiments.

With respect to FIG. 2A and FIG. 2B, elements with like element numbering, as depicted in FIG. 1A and FIG. 1B, are intended to be the same and will not necessarily be repeated for the sake of clarity.

With reference to FIG. 2A and FIG. 2B, transducer 102 may be in electronic communication with a positive terminal 132 of OP-AMP 110, in accordance with various embodiments. In various embodiments, constant voltage source 104 may be in electronic communication with a negative terminal 134 of OP-AMP 110. In this light, transducer 102 may be in electronic communication with a positive terminal 132 of OP-AMP 110 in response to constant voltage source 104 being in electronic communication with a negative terminal 134 of OP-AMP 110. In this arrangement, as illustrated in FIG. 2A, OP-AMP 110 may be configured to output a signal (also referred to herein as an output signal) 126 comprising a first magnitude 256 in response to the variable signal 122 being greater than the constant voltage source signal 124 and may be configured to output an output signal 126 comprising a second magnitude 254 in response to the variable signal 122 being less than the constant voltage source signal 124.

With reference again to FIG. 1A, transducer 102 may be in direct electronic communication with the OP-AMP 110, wherein the term "direct", in this sense, may mean that transducer 102 is electrically coupled directly to OP-AMP 110 with no other systems or elements between transducer 102 and OP-AMP 110 except for a wire. Constant voltage source 104 may be in direct electronic communication with the OP-AMP 110, wherein constant voltage source 104 is electrically coupled directly to OP-AMP 110 with no other systems between constant voltage source 104 and OP-AMP 110. In various embodiments, constant voltage source 104 may supply constant voltage source signal 124 to OP-AMP 110. Constant voltage source signal 124 may be the value of the voltage supplied by constant voltage source 104. In various embodiments, constant voltage source signal 124 may comprise any value. In various embodiments, constant voltage source signal 124 may comprise between 0 volts and 12 volts. In various embodiments, constant voltage source signal 124 may comprise between 0 volts and 1 volt.

Figure 4:
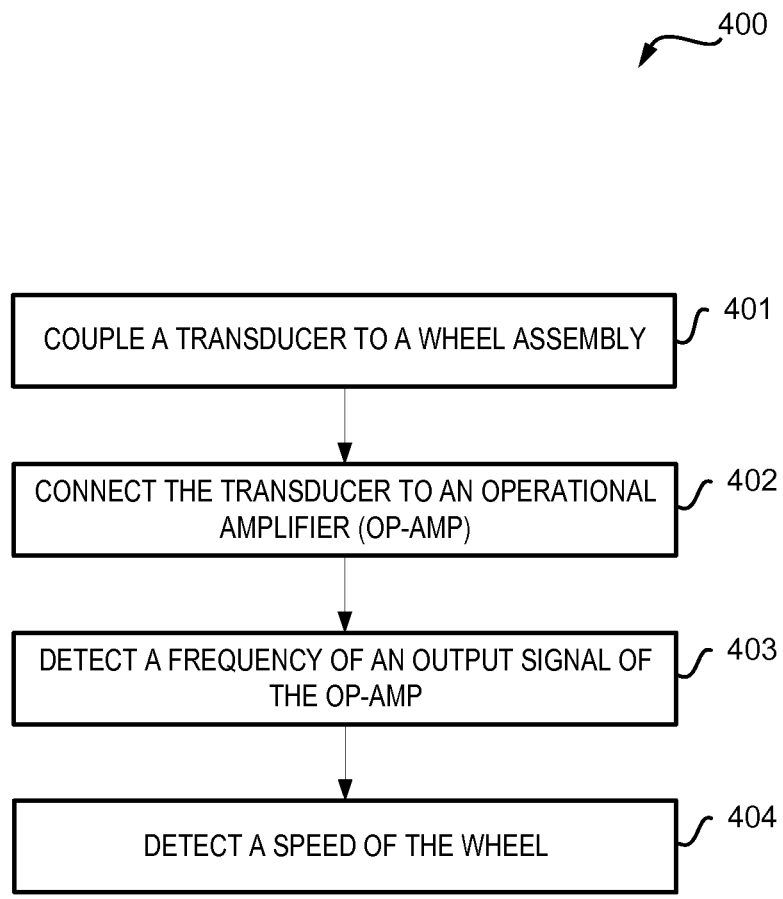
FIG. 4 illustrates a method for detecting a wheel speed, in accordance with various embodiments.

With reference to FIG. 4, a method 400 for detecting a speed of a wheel is provided, in accordance with various embodiments. In various embodiments, method 400 may include coupling a transducer to a wheel assembly (step 401), connecting the transducer to an OP-AMP (step 402), detecting a frequency of an output signal of the PO-AMP (step 403), and detecting a speed of the wheel (step 404).

In various embodiments, with further reference to FIG. 1A and FIG. 3, step 401 may include coupling transducer 102 to wheel assembly 300. Step 402 may include electronically connecting transducer 102 to OP-AMP 110. Step 403 may include detecting a frequency of output signal 126 of OP-AMP 110. Step 404 may include detecting a speed of wheel 304 using the frequency of output signal 126 of OP-AMP 110. Electric circuit 100 may provide a consistent output of wheel speed regardless of a reduced amplitude of variable signal 122 in response to a reduced wheel speed. Stated another way, electric circuit 100 may be able to detect the speed of a wheel at slow velocities even though the amplitude of variable signal 122 may be reduced at such speeds, for example, less than 1 volt.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric circuit for detecting a low wheel speed of an aircraft, comprising:
   a variable reluctance transducer in electronic communication with a first input terminal of an operational amplifier (OP-AMP), the variable reluctance transducer configured to convert speed information of a wheel of the aircraft into a periodic voltage signal and output a variable signal in response to the low wheel speed, wherein the variable signal includes signals with amplitudes less than one volt;
   a first supply voltage in electrical communication with a first terminal of the OP-AMP;
   a second supply voltage in electrical communication with a second terminal of the OP-AMP;
   a constant voltage source in direct electrical communication with a second input terminal of the OP-AMP and configured to output a constant voltage signal having a first amplitude greater than zero volts and less than one volt;
   a sensor in electronic communication with an output terminal of the OP-AMP and configured to monitor an output signal of the OP-AMP, the output signal of the OP-AMP comprising a first magnitude in response to the variable signal having a second amplitude greater than the constant voltage signal and a second magnitude in response to the variable signal being less than the constant voltage signal and including a period; and
   a controller configured to receive the output signal and calculate the low wheel speed of the wheel by multiplying a pre-determined ratio of the low wheel speed by the period, wherein a range of the low wheel speed includes one mile per hour.

2. The electric circuit of claim 1, wherein the variable reluctance transducer is coupled to the wheel.

3. A method for detecting a low wheel speed of an aircraft, comprising:
   detecting a frequency of an output signal of an operational amplifier (OP-AMP), the OP-AMP in electronic communication with a variable reluctance transducer configured to convert speed information of a wheel of the aircraft into a periodic voltage signal and output a variable signal in response to the low wheel speed, and in direct electronic communication with a constant voltage source configured to output a constant voltage signal having an amplitude greater than zero volts and less than one volt, the output signal of the OP-AMP generated by comparing the variable signal with the amplitude of the constant voltage signal and comprising a first magnitude in response to the variable signal being greater than the constant voltage signal and a second magnitude in response to the variable signal being less than the constant voltage signal, wherein the variable signal includes signals with amplitudes less than one volt; and
   detecting the low wheel speed of the wheel by multiplying a pre-determined ratio of the low wheel speed by the frequency of the output signal of the OP-AMP, wherein a range of the low wheel speed includes one mile per hour.

4. The method of claim 3, further comprising coupling the variable reluctance transducer to the wheel.

5. The method of claim 3, further comprising connecting the variable reluctance transducer to the OP-AMP.

6. A system for detecting a low wheel speed of an aircraft, comprising:
   a variable reluctance transducer, the variable reluctance transducer configured to convert speed information of a wheel of the aircraft into a periodic voltage signal and output a variable signal in response to the low wheel speed, wherein the variable signal includes signals with amplitudes less than one volt;
   an electronics control unit in electronic communication with the variable reluctance transducer comprising:
      an operational amplifier (OP-AMP) having a first input terminal and a second input terminal;
      a first supply voltage in electrical communication with a first terminal of the OP-AMP;
      a second supply voltage in electrical communication with a second terminal of the OP-AMP;
      a constant voltage source in direct electrical communication with the second input terminal and configured to output a constant voltage signal having an amplitude greater than zero volts and less than one volt; and
      a sensor in electronic communication with an output terminal of the OP-AMP and configured to monitor an output signal of the OP-AMP, the output signal of the OP-AMP comprising a first magnitude in response to the variable signal being greater than the constant voltage signal and a second magnitude in response to the variable signal being less than the constant voltage signal and including a period; and
      a controller configured to receive the output signal and calculate the low wheel speed of the wheel by multiplying a pre-determined ratio of the low wheel speed by the period, wherein a range of the low wheel speed includes one mile per hour.

7. The system of claim 6, wherein the variable reluctance transducer is coupled to the wheel.

* * * * *